US008377556B2

United States Patent
Chan et al.

(10) Patent No.: US 8,377,556 B2
(45) Date of Patent: Feb. 19, 2013

(54) MATERIAL FOR GROWTH OF CARBON NANOTUBES

(75) Inventors: Adeline Chan, Singapore (SG); Ivan Teo, Singapore (SG); Zhonglin Miao, Singapore (SG); Shanzhong Wang, Singapore (SG); Vincenzo Vinciguerra, Biancavilla (IT)

(73) Assignee: STMicroelectronics Asia Pacific Pte., Ltd., Singapore (SG)

( * ) Notice: Subject to any disclaimer, the term of this patent is extended or adjusted under 35 U.S.C. 154(b) by 795 days.

(21) Appl. No.: 12/324,685

(22) Filed: Nov. 26, 2008

(65) Prior Publication Data
US 2010/0129549 A1    May 27, 2010

(51) Int. Cl.
*B32B 9/00* (2006.01)
*B32B 15/14* (2006.01)

(52) U.S. Cl. ........ 428/408; 438/682; 438/683; 428/450; 977/742; 977/750; 977/752

(58) Field of Classification Search .................. 428/408
See application file for complete search history.

(56) References Cited

U.S. PATENT DOCUMENTS

| | | | | |
|---|---|---|---|---|
| 5,047,367 A * | 9/1991 | Wei et al. | ...... | 438/607 |
| 5,302,552 A * | 4/1994 | Duchateau et al. | ...... | 438/664 |
| 5,356,837 A * | 10/1994 | Geiss et al. | ...... | 438/535 |
| 5,449,642 A * | 9/1995 | Tan et al. | ...... | 438/151 |
| 5,536,684 A * | 7/1996 | Dass et al. | ...... | 438/535 |
| 5,567,651 A * | 10/1996 | Berti et al. | ...... | 438/303 |
| 5,780,362 A * | 7/1998 | Wang et al. | ...... | 438/683 |
| 5,902,129 A * | 5/1999 | Yoshikawa et al. | ...... | 438/592 |
| 5,970,370 A * | 10/1999 | Besser et al. | ...... | 438/586 |
| 6,281,102 B1 * | 8/2001 | Cao et al. | ...... | 438/592 |
| 6,346,477 B1 * | 2/2002 | Kaloyeros et al. | ...... | 438/680 |
| 6,410,429 B1 * | 6/2002 | Ho et al. | ...... | 438/655 |
| 6,653,227 B1 * | 11/2003 | Lai et al. | ...... | 438/633 |
| 6,916,729 B2 * | 7/2005 | Fang et al. | ...... | 438/583 |
| 7,667,999 B2 * | 2/2010 | Herner et al. | ...... | 365/148 |
| 7,767,499 B2 * | 8/2010 | Herner | ...... | 438/129 |
| 7,924,602 B2 * | 4/2011 | Herner et al. | ...... | 365/148 |
| 7,982,209 B2 * | 7/2011 | Herner et al. | ...... | 257/14 |
| 7,982,318 B2 * | 7/2011 | Heo et al. | ...... | 257/774 |
| 2003/0211724 A1 * | 11/2003 | Haase | ...... | 438/629 |
| 2005/0130417 A1 * | 6/2005 | Ahn et al. | ...... | 438/682 |
| 2007/0190722 A1 * | 8/2007 | Herner | ...... | 438/257 |
| 2008/0239790 A1 * | 10/2008 | Herner et al. | ...... | 365/151 |
| 2008/0296706 A1 * | 12/2008 | Agnello et al. | ...... | 257/412 |
| 2010/0108972 A1 * | 5/2010 | Zhao et al. | ...... | 257/2 |
| 2010/0142255 A1 * | 6/2010 | Herner et al. | ...... | 365/148 |
| 2010/0176366 A1 * | 7/2010 | Fu et al. | ...... | 257/4 |
| 2010/0264544 A1 * | 10/2010 | Heo et al. | ...... | 257/768 |

OTHER PUBLICATIONS

Chang, H.L., Lin, C.H., Kuo, C.T., "Iron and cobalt silicide catalysts-assisted carbon nanostructures on the patterned Si Substrates", Thin Solid Films, 420-421 (2002) 219-224.*
Wen, H.-C., Yang, K., Ou, K.-L., Wu, W.-F., Luo, R.-C., Chou, C.-P., "carbon nanotubes grown using cobalt silicide as catalyst and hydrogen pretreatment", Microelectronic Engineering 82 (2005) 221-227.*
Yang, W.-C., Yang, T.-Y., Yew, T.-R., "Growth of self-aligned carbon nanotube for use as a field-effect transistor using cobalt silicide as a catalyst", Carbon 45 (2007) 1679-1685.*

* cited by examiner

*Primary Examiner* — Jason L. Lazorcik
(74) *Attorney, Agent, or Firm* — Munck Wilson Mandala, LLP

(57) ABSTRACT

Systems and methods for creating carbon nanotubes are disclosed that comprise a growing a nanotube on a tri-layer material. This tri-layer material may comprise a catalyst and at least one layer of Ti. This tri-layer material may be exposed to a technique that is used to grow a nanotube on a material such as a deposition technique.

10 Claims, 4 Drawing Sheets

MATERIAL FOR GROWTH OF CARBON NANOTUBES

TECHNICAL FIELD

The present invention relates to the materials used to synthesize metal silicide for contact technology and particularly to use the metal silicide as a catalyst to grow carbon nanotubes and in turn the carbon nanotubes can serve as interconnects for integrated circuit in manufacturing.

BACKGROUND

Carbon nanotubes are allotropes of carbon with a nanostructure with a length-to-diameter ratio that has a much larger length than diameter. These cylindrical carbon molecules have novel properties that make them potentially useful in many applications in nanotechnology, electronics, optics and other fields of materials science, as well as potential uses in architectural fields. They exhibit extraordinary strength and unique electrical properties, and are efficient conductors of heat. Creating nanotubes is an expensive process, and systems and methods useful in creating nanotubes are needed.

SUMMARY

The present invention overcomes the problem of current interconnects used in the 45 nm node and below and provides a different material to grow carbon nanotubes and this material can be used as the contact or interconnect of the silicon devices. The fabrication method is compatible with silicon technology.

The method of growing carbon nanotubes on metal silicide comprises of the following two steps: (a) preparation of the metal silicide; and (b) synthesis the carbon nanotubes using Microwave Plasma Enhanced Chemical Vapor Deposition (MPECVD) and Thermal CVD The formation of metal silicide is first achieved by coating the Si substrates with a layer (with thickness ranging from 2 nm to 10 nm) of Ti, indicated as the metal underlayer. The second layer consists of a layer of catalyst, Co (with thickness ranging from 0.5 nm to 6 nm). After that, a thin layer of Ti is deposited on top of the catalyst layer as a capping layer. The capping layer served as a barrier against diffusion of oxygen. The trilayer formation is followed by the annealing steps. Two steps of rapid thermal annealing processes are introduced to form the metal silicide. The temperature used to obtain metal silicide has to be dependent on the metal used. Different metal uses different temperature to obtain metal silicide.

The formation of metal silicide by using Co/Ti-bilayer and a capping layer of Ti has helped to form an active metal silicide which is able to work as a catalyst for the growth of carbon nanotubes.

In conclusion, the present disclosure uses multi-layers of metals to form metal silicide which can be used in silicide technology for contact. The metal silicide can also be used to grow carbon nanotubes which served as a connection with the contact.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
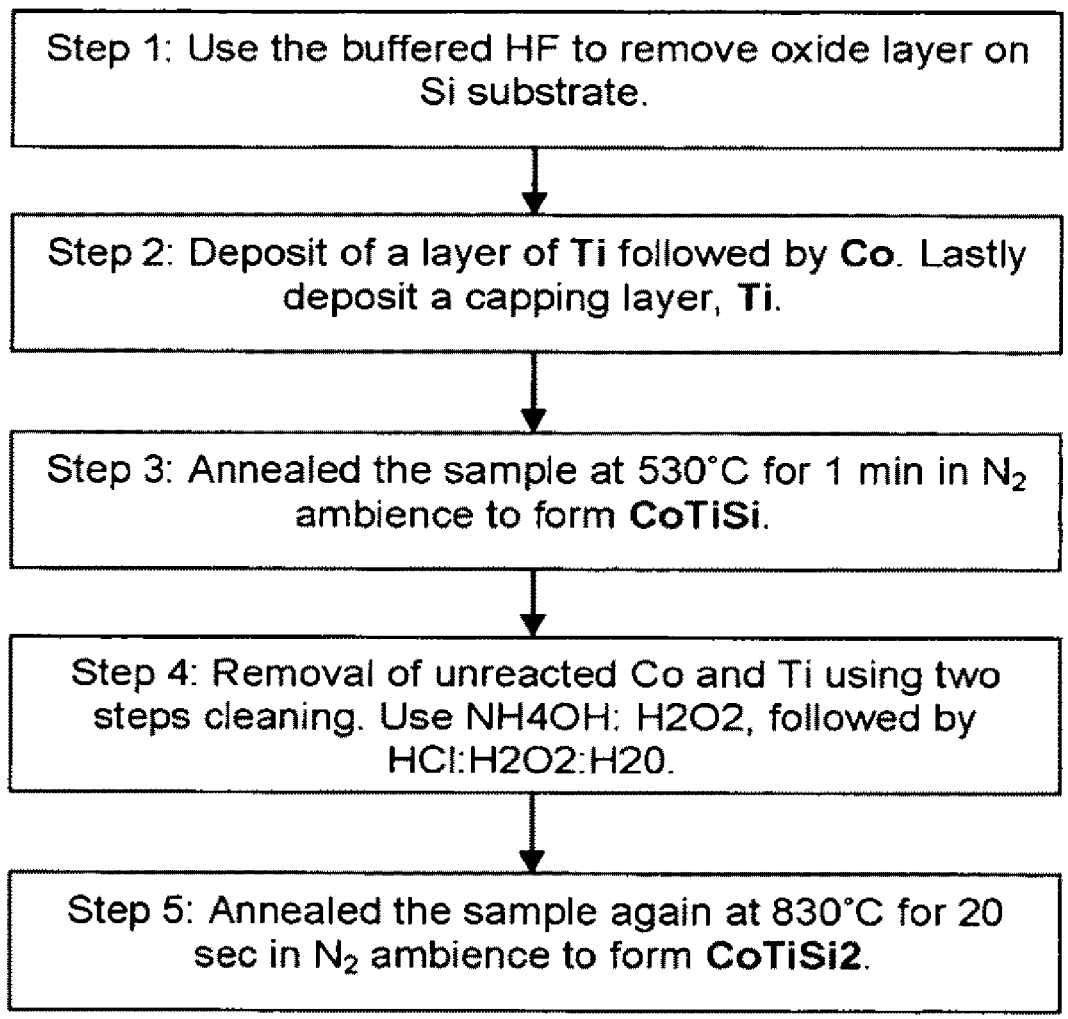
FIG. 1 Flow chart showing the process of fabricating the three layer metals for the metal silicide that acts as a catalyst.

The present invention provides a new material that can be a catalyst for the growth of carbon nanotubes and exploited as a material for the current contact technology in semiconductor industry.

Most studies had shown that the chemical vapour synthesis of carbon nanotubes can be achieved by using transition-metals in the form of nanometric particle working as catalysts for the nucleation and subsequent growth of CNTs. The most used transition metal catalysts employed for the growth of carbon nanotubes have been Ni, Fe, and Co since the beginning of the exploitation of the CVD process. However, recently the use of alloys of Co and Fe with other transition-metals like Ti and Al (e.g. Co—Ti, Fe—Al) has been considered. Such alloys allow synthesizing carbon nanotubes with an improved adhesion of the carbon nanotubes on the catalyst as well as a reduced growth temperature. Eventually, Co silicide and Ni silicide have been reported as potential catalyst for carbon nanotubes growth.

Because of their intrinsic low resistivity, metal silicides are applied in microelectronic devices at the contact level. Their use as a substrate from where the CNTs can grow directly would be beneficial for the contact level. In fact, without changing much the process of microelectronics devices, it would be possible to reduce further the aspect ratio of the contact geometry without having an increase of the resistivity, as it is going to happen in the actual copper technology. Thus the contact in the interconnect structure may be replaced by carbon nanotubes. Going into the particulars, with the physical dimension of the devices scaling down, the dimension of interconnects need to be reduced as well. However this cause an increase of resistivity that can be solved only by changing the nature of the material used for the interconnect, as occurred in the transition from Al to Cu. In the case of nanometer contacts, the increase of resistivity can be solved by using the carbon nanotubes to produce micrometer or nanometer devices. However, there is a drawback in using carbon nanotubes to replace metal material (e.g. tungsten, copper, aluminum etc.). The disadvantage lies on the process of carbon nanotubes growth which needs to deposit a layer of catalyst on the contact level to grow carbon nanotubes. Therefore, using carbon nanotubes will contribute to additional process steps. If metal silicide is used to grow carbon nanotubes, the advantages are no additional process and mask steps will be used.

Metal silicides such as NiSi2 and CoSi2 are normally employed at the contact level. However, there are some issues pertaining the use of nickel silicide, $NiSi_2$ and cobalt silicide, $CoSi_2$ for the carbon nanotubes growth. The first problem is that carbon nanotubes growth was achieved only on Ni monosilicide but not Ni disilicide [1]. The reason Ni disilicide doesn't act as a catalyst is still uncertain [1]. $NiSi_2$ has a larger sheet resistance compared to $CoSi_2$; hence they are not so attractive in terms of functioning as interconnect materials.

Thus, $CoSi_2$ seems to be the more favorable material but unfortunately, there is no report on $CoSi_2$ carbon nanotubes growth mentioning the chemical used to remove the unreacted Co after cobalt disilicide, CoSi formation. Only [2] has claimed that carbon nanotubes can be grown on $CoSi_2$ using implantation method to achieve $CoSi_2$. In fact, in the formation process of self-aligned $CoSi_2$ contact, it is necessary to remove the unreacted cobalt in order to avoid short circuit paths in microelectronics devices. Most report [3-6] claimed that they formed $CoSi_2$ using either thermal or rapid thermal annealing and then followed by carbon nanotubes growth. In conclusion, those reports did not mention about the unreacted Co during CoSi formation. Thus, the unreacted cobalt for formation of $CoSi_2$ will result in carbon nanotubes growth. We have tried to grow carbon nanotubes on $CoSi_2$ by using the conventional method to form $CoSi_2$ but there is no carbon nanotubes growth. There is therefore a need to investigate other potential types of silicide in the hope of overcoming the problems associated with $NiSi_2$ and $CoSi_2$.

We used multi-layer of metal (Ti/Co/Ti) to form metal silicide. The top layer is considered as a capping layer which served as a barrier against diffusion of oxygen. The bilayer of Co/Ti is to synthesize CoTi silicide. We have demonstrated that carbon nanotubes can be vertically grown using the new metal silicide, CoTi silicide.

FIG. 1 shows a flow chart explaining the fabrication process for formation of metal silicide.

In the following examples, steps are used to denote one order of carrying out the disclosed methods. However, it is explicitly understood that other orders of steps could be used consistent with the presently disclosed systems and methods.

In step 1 of the method, the substrate is dipped in a buffered HF etching solution for less than 1 minute to remove the thin oxide layer on the Si substrate.

In step 2 of the method, it involves the deposition of a metal underlayer, which can be Ti, Al, In, Mo or a mixture of two or more of these metals, on the Si substrate, and followed, by deposition of catalyst which can be Co, Ni or a mixture of both. Then a thin layer of Ti is deposited on top of the catalyst as a capping layer. It helps to prevent oxidation of catalyst during annealing in $N_2$ ambience. All the deposition can be done by sputtering or ebeam evaporation.

In step 3 of the method, a rapid thermal annealing step is performed. The sample is annealed at 530° C. for 1 min in $N_2$ ambience to form monosilicide.

In step 4 of the method, any unreacted metal will be removed by using two steps wet chemical etching process. $NH_4OH:H_2O_2$ followed by $HCl:H_2O_2:H_2O$ are used to remove the unreacted metal.

In step 5 of the method, a rapid thermal annealing is performed again. The sample is annealed at 830° C. for 20 sec in $N_2$ ambience to form disilicide.

FIGS. 2A to 2G show the processing steps of fabricating carbon nanotube on the contact according to an embodiment of the present invention. This invention chooses to use Ti as a metal underlayer and Co as a catalyst. Other metal and catalyst materials that are mentioned above can also be used to form metal silicide for CNT growth.

Figure 2A:
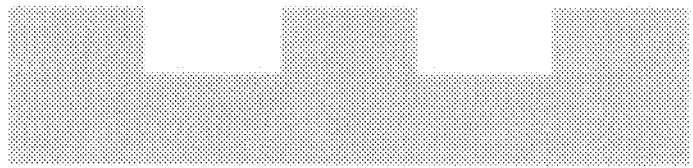
FIGS. 2A to 2G Section schemes showing the processing steps of fabricating $CoTiSi_2$ and carbon nanotube on the contact according to an embodiment of the present invention.

As shown in FIG. 2A, silicon substrate has formed a silicon dioxide masking layer with patterned which exposed to the silicon surface. This silicon surface area is used for the contact of interconnect. The silicon surface is the bottom level of interconnect structure which provide the connection to essentially all doped regions in the silicon. The thin oxide layer on the silicon surface has to be removed to obtain metal silicide. The metal silicide is prepared according to the steps illustrated in FIG. 1.

Figure 2B:
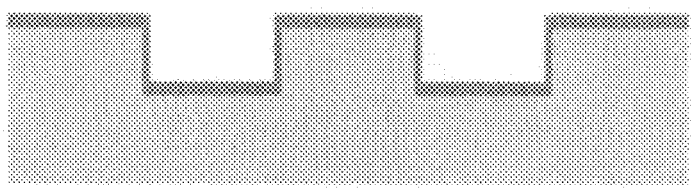
Figure 2C:
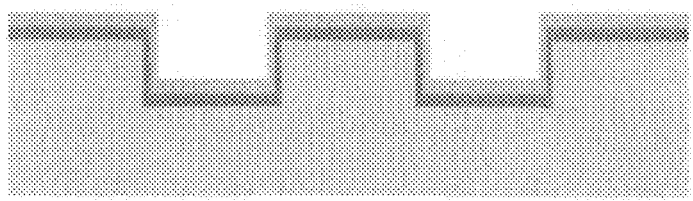
Figure 2D:
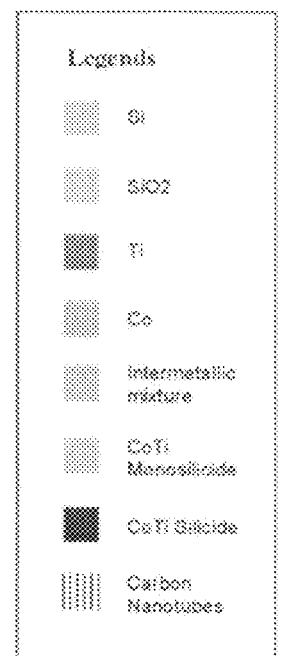
Figure 2D:
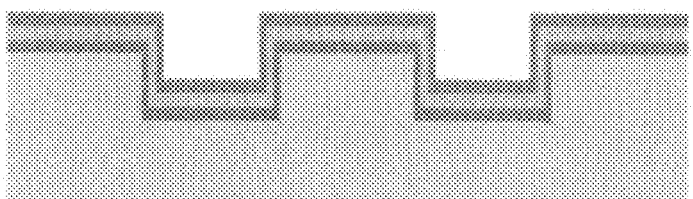

After removing the thin oxide layer on the silicon surface, a titanium metal layer, and a cobalt metal layer are deposited using sputtering as shown in FIG. 2B and FIG. 2C. Then a titanium metal layer is deposited on top of cobalt metal layer which is shown FIG. 2D. The titanium metal layer is to prevent the cobalt metal layer from oxidation which has been mentioned above.

After the titanium capping, the substrate is transfer to a rapid thermal annealing chamber. The first annealing is performed at 530° C. for 1 min in $N_2$ ambience. This first annealing process has obtained a number of reactions, with titanium layer, cobalt layer and at the interfaces with silicon surface. This first annealing process is to obtain CoTi monosilicide.

Figure 2E:
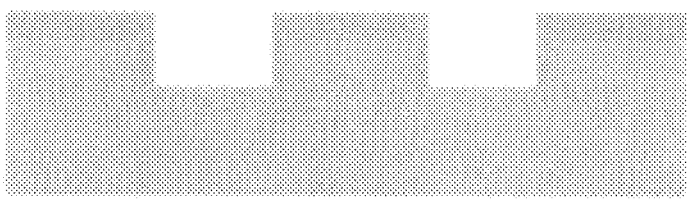

During the first annealing process, Si reacts with Ti to form a TiSi layer; Co diffuses into the Ti layer and formed an intermetallic mixture, CoSi and CoTiSi layer as shown in FIG. 2E. The capping layer of Ti experiences some nitridation. The phenomenon is shown in FIG. 4 after the first annealing.

Figure 2F:
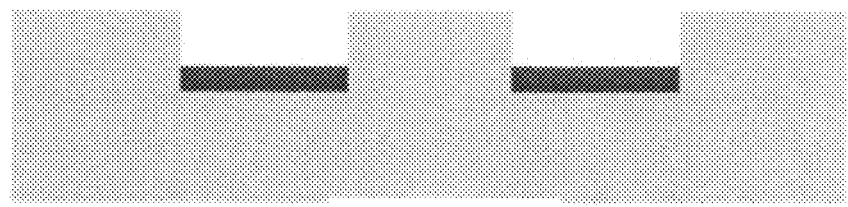

After the formation of CoTi monosilicide, the unreacted metals are removed using chemicals which are mentioned in FIG. 1. A second annealing is performed at 830° C. for 20 sec in $N_2$ ambience. The CoTi disilicide is obtained in this step. FIG. 2F shows the CoTi disilicide formation.

Figure 2G:
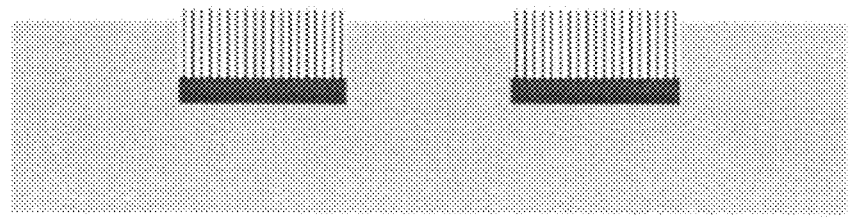
Figure 3:
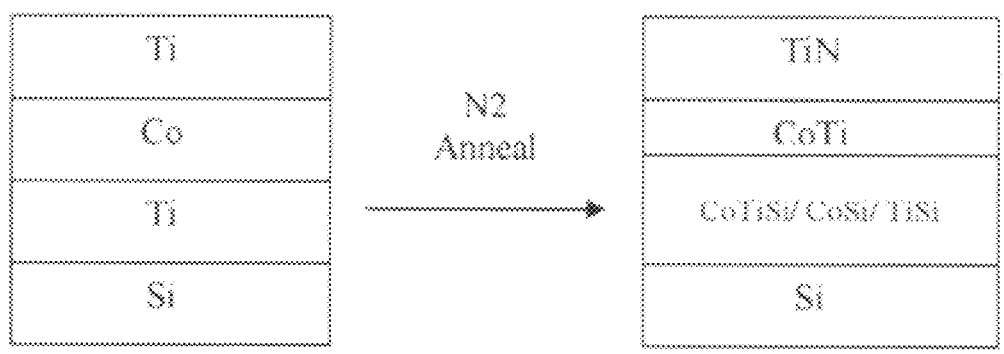
FIG. 3 shows the possible reaction results of the metal silicide produced by the multi-layer of metals during the annealing steps.
Figure 4A:
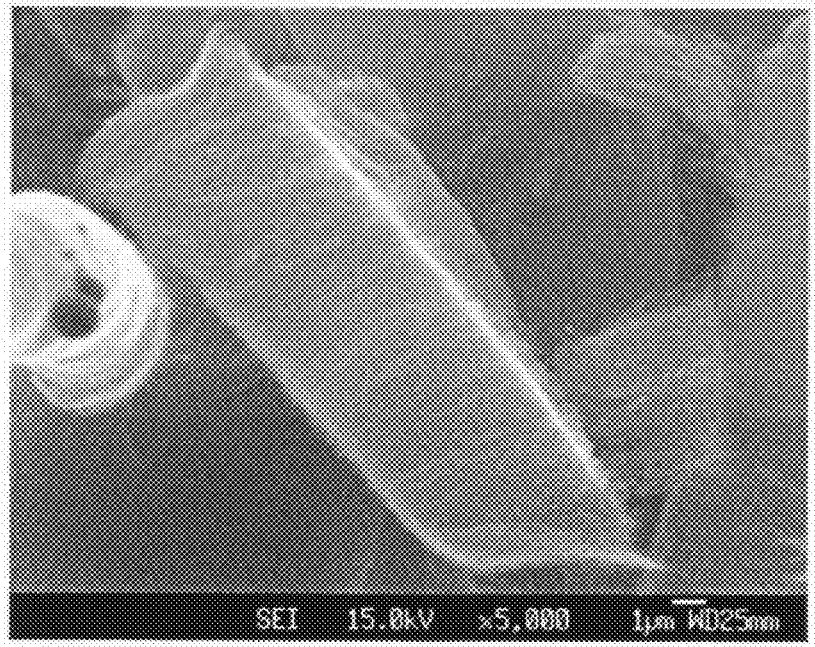
FIGS. 4A and 4B show the scanning electron microscope photo of carbon nanotubes growth using CoTi silicide.
Figure 4B:
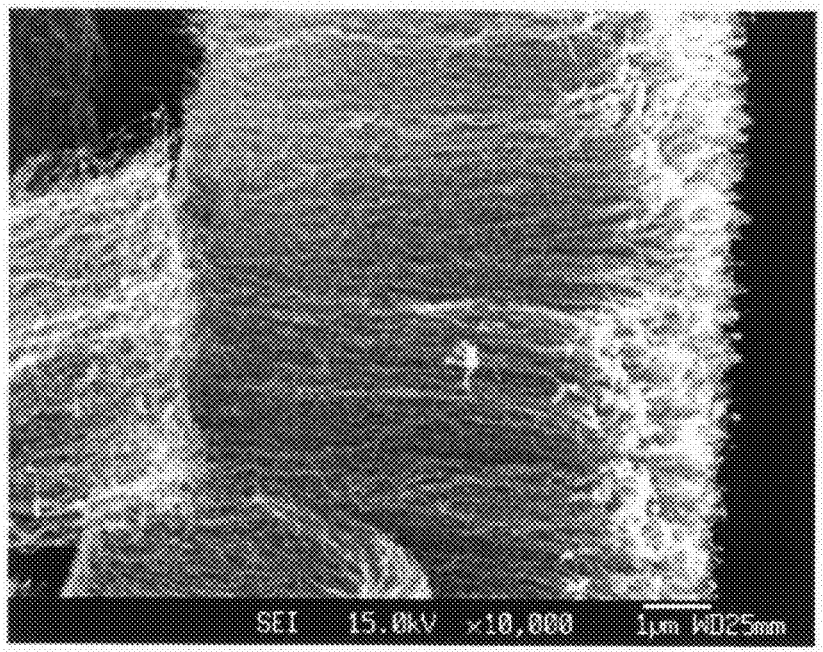

As shown in FIG. 2G, the carbon nanotubes are achieved on the CoTi monosilicide. The carbon nanotubes growth has been performed using Microwave Plasma Enhanced Chemical Vapor Deposition (MPECVD). The growth can also be done using the Thermal CVD and other possible equipment used to grow carbon nanotubes. The growth processes involve pre-treatment and deposition. For the pre-treatment, the substrate is annealed with $H_2$ until the temperature reached 800° C. as shown in FIG. 3. The plasma and DC bias with $CH_4/H_2$ were introduced during the deposition process at 800° C. for 2 minutes. The vertical CNT growth results, using the invented silicide as catalyst, are shown in FIGS. 4A and 4B.

As shown in FIG. 3G, the carbon nahotubes are achieved on the CoTi monosilicide. The carbon nanotubes growth has been performed using Microwave Plasma Enhanced Chemical Vapor Deposition (MPECVD). The growth can also be done using the Thermal CVD and other possible equipment used to grow carbon nanotubes. The growth processes involve pre-treatment and deposition. For the pre-treatment, the substrate is annealed with H2 until the temperature reached 800 ° C. The plasma and DC bias with CH4/H2 were introduced during the deposition process at 800° C. for 2 minutes. The vertical CNT growth results, using the invented silicide as catalyst, are shown in FIG. 5A and 5B.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:
1. A metal silicide structure, comprising:
a cobalt titanium disilicide ($CoTiSi_2$) formed on a silicon (Si) substrate by annealing a first layer comprising titanium (Ti), a second layer comprising a cobalt (Co), and a third layer over the second layer, wherein the third layer comprises titanium (Ti), wherein a monosilicide is formed by reaction of the cobalt in the second layer with at least the titanium in the first layer and the silicon substrate during annealing, and wherein the disilicide is formed by annealing the silicon substrate and the monosilicide; and at least one carbon nanotube formed on the cobalt titanium disilicide.

2. The metal silicide structure of claim 1, wherein the Ti in the first layer has a thickness ranging from 2 nm to 10 nm.

3. The metal silicide structure of claim 2, wherein the second layer has a thickness ranging from 0.5 nm to 6 nm.

4. The metal silicide structure of claim 1, wherein the monosilicide is formed by rapid thermal annealing of the first, second and third layers.

5. The metal silicide structure of claim 1, wherein the disilicide is formed by two iterations of rapid thermal annealing, a first iteration performed on the substrate and the first, second and third layers and a second iteration performed on the substrate and the monosilicide.

6. The metal silicide structure of claim 1, wherein the third layer forms a barrier against diffusion of oxygen.

7. A metal silicide structure, comprising:
cobalt titanium disilicide ($CoTiSi_2$) on a silicon substrate; and
a plurality of carbon nanotubes formed on the cobalt titanium disilicide.

8. The metal silicide of claim 7, wherein the cobalt titanium disilicide comprises a disilicide formed by annealing a first layer comprising titanium on a silicon substrate, a second layer comprising cobalt over the titanium, and a third layer comprising titanium over the second layer, the substrate and the first, second and third layers annealed to form a monosilicide.

9. The metal silicide of claim 8, wherein the cobalt titanium disilicide comprises a disilicide formed by removing unreacted metal after annealing the substrate and the first, second and third layers, and annealing the substrate and the monosilicide to form the disilicide.

10. The metal silicide of claim 8, wherein the monosilicide comprises cobalt titanium monosilicide (CoTiSi).

* * * * *